United States Patent [19]

Guderley

[11] Patent Number: 4,487,498
[45] Date of Patent: Dec. 11, 1984

[54] COPIER

[76] Inventor: Bernd M. Guderley, Vogesenring 1, D-7813 Staufen, Fed. Rep. of Germany

[21] Appl. No.: 394,921

[22] PCT Filed: Jun. 13, 1981

[86] PCT No.: PCT/DE81/00090
§ 371 Date: Jun. 28, 1982
§ 102(e) Date: Jun. 28, 1982

[87] PCT Pub. No.: WO82/01597
PCT Pub. Date: May 13, 1982

[30] Foreign Application Priority Data
Oct. 31, 1980 [DE] Fed. Rep. of Germany ....... 3041037

[51] Int. Cl.³ .............................................. G03G 15/00
[52] U.S. Cl. ...................................... 355/14 R; 355/61
[58] Field of Search .................. 355/14 R, 5, 3 R, 61, 355/12, 67, 44

[56] References Cited
U.S. PATENT DOCUMENTS

| | | | |
|---|---|---|---|
| 1,266,060 | 5/1918 | Schwab | 355/61 |
| 3,620,624 | 11/1971 | Van Acker | 355/61 |
| 3,771,082 | 11/1973 | Matsumoto | 355/67 |
| 3,881,817 | 5/1975 | Kidd et al. | 355/12 |
| 4,092,066 | 5/1978 | Kawai | 355/67 |
| 4,174,175 | 11/1979 | DiMaria | 355/44 |
| 4,244,649 | 1/1981 | Rees et al. | 355/61 |

Primary Examiner—A. C. Prescott
Attorney, Agent, or Firm—Peter K. Kontler

[57] ABSTRACT

A copier for copying documents, drawings and similar originals onto paper has a window for supporting an original. A source of copying light is located below this window. The copier has a light source, advantageously the source of copying light itself, which is capable of being activated independently of the copying operation so that the original may be transilluminated without intiating the copying operation. This makes it possible to precisely position the original before the actual copying operation. A slidable or superimposable mask or the like may be provided between the light source and the original in order to display orientation symbols on the transilluminated original.

20 Claims, 3 Drawing Figures

COPIER

BACKGROUND OF THE INVENTION

The invention relates to a copier for copying documents, drawings and similar originals onto paper. The copier has a window on which the original is supported during copying as well as a source of copying light for illuminating the original during the copying operation.

A substantial disadvantage of such copiers is that properly oriented sectional or partial copies of originals having dimensions which exceed those of the window can be prepared only with difficulty. In particular, the desired section is usually not obtained; and, in addition, the correct position of the original cannot be readily achieved. This is especially true when there is no guide for the original or when the guide is not suitable for all situations. In practice, therefore, several trial copies, and in most cases many trial copies, must be made with corresponding adjustments in position. This is time-consuming and uneconomical.

OBJECTS AND SUMMARY OF THE INVENTION

Accordingly, the object of the present invention is to provide a copier of the type outlined above which makes it possible to prepare copies of a portion of a large original in a single copying operation.

To this end, the invention provides a light source which is capable of being activated independently of the copying operation and which is arranged to illuminate that side of the original on which the latter rests. According to one embodiment, the original is transilluminated so that the original may be shifted into its proper position from externally of the copies with the aid of the guide which is then likewise visible. Thereafter, the desired sectional or partial copy may be obtained in a single copying operation. Advantageously, the light source is the source of the copying light and a switch having a stop for suppressing the copying operation during transillumination is provided for the light source. This permits the source of copying light to be switched on independently of and without initiating the copying operation. Accordingly, only a few additional elements are required for a copier in accordance with the invention so that an existing copiers may be readily modified.

In a favorable further development of the invention, a slidable or superimposable mask or the like is provided between the light source and the original to display orientation symbols on the original. Advantageously, the mask has a grid. The grid may be formed by either dashed or full lines and favorably resembles a coordinate system. The original may then be placed in position in a particularly simple manner and, in addition, very precise positioning is possible. It is to be mentioned that the orientation symbols are not present during the copying operation so that interference with the copying operation is avoided.

In a further embodiment of the invention, a mirror or similar reflecting arrangement is provided to permit external inspection of originals which are supported in copying position. This makes it possible to orient originals which are non-transparent or have little transparency in the desired manner.

BRIEF DESCRIPTION OF THE DRAWINGS

The details of the invention are more fully described below with reference to the drawings in which.

DESCRIPTION OF THE PREFERRED EMBODIMENTS

Figure 1:
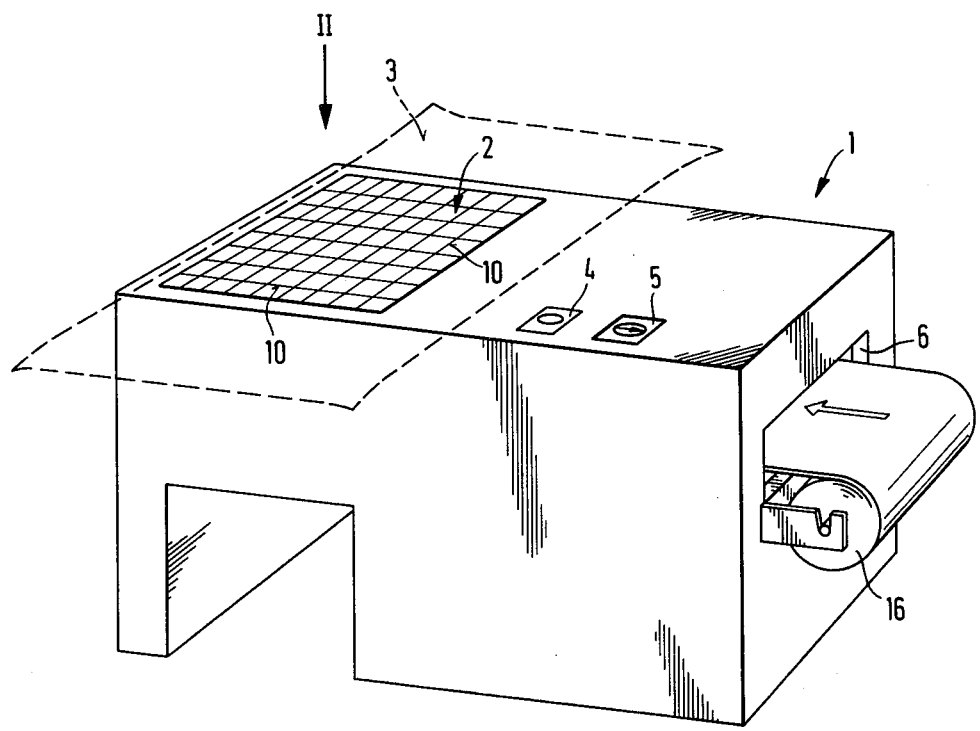
FIG. 1 is a schematic, perspective view of a copier with an original resting on the same.
Figure 2:
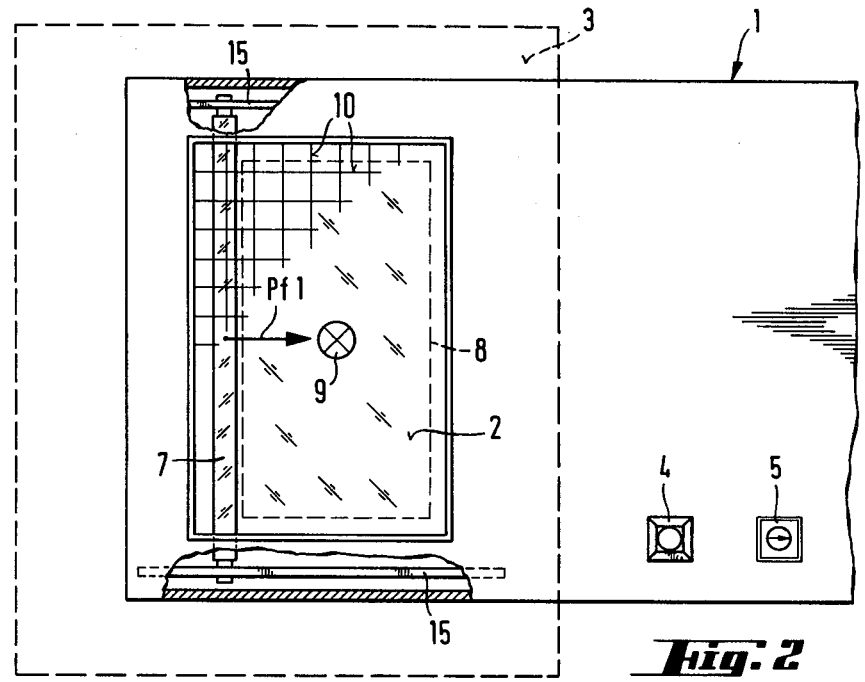
FIG. 2 is a partial plan view of the copier of FIG. 1.

A copier identified generally by the reference numeral 1 serves to copy documents, drawings and similar originals onto paper. The copier has a window or transparent support 2 on which an original 3, which is indicated by dashed lines in FIGS. 1 and 2, is supported during the copying operation. The references numerals 4 and 5 identify control knobs of the copier 1. A supply of paper may be inserted into the lateral opening 6 of the copier 1.

The original 3 is illuminated by a source 7 of copying light (FIGS. 2 and 3) during the copying operation. The source 7 moves in the direction of the arrow Pf 1 shown in FIG. 2 so that the entire original is illuminated by successively illuminating portions thereof.

In FIG. 2, it will be observed that the original 3, which is only partly illustrated, is substantially larger than the window 2. The region 8 within the window 2 bounded by a dashed rectangle represents the portion of the original 3 which is to be copied. Since the back side of the original 3, which does not have writing, faces an observer, the region 8 to be copied cannot be precisely positioned within the window 2 from externally of the copier 1. As a rule, therefore, several trial copies were made heretofore until the desired copy was achieved. According to the invention, the copier 1 has a switch 4 which permits a light source arranged to illuminate the side of the original 3 resting on the window to be activated independently of the copying operation. In this manner, the original 3 may be transilluminated so that an observer can determine from the back whether the desired region 8 is properly positioned on the window 2. Thus, a good opportunity for inspection exists before the actual copying operation so that the desired region 8 may be copied in one step without making trial copies. As illustrated in FIG. 2, the transilluminating light source may be constituted by an additional lamp 9. Advantageously, the light source 9 is switched off at the beginning of the copying operation, e.g. by operating the switch 5. However, it is also possible to use the source of copying light as the light source 7 for effecting transillumination prior to the copying operation.

If need be, a shutter may be provided to cover parts of the copier 1 which are sensitive to light during the period that the additional light source 9 or the source 7 of copying light is operated in order to transilluminate the original 3. This shutter may then be removed as necessary for the copying operation, e.g. by pivoting.

According to a further embodiment of the invention, the intensity of the light source 9 or 7 may be adjustable, e.g. via a dimmer or the like which is operable from externally of the copier 1. This makes it possible to adjust to the particular conditions, e.g. to different thicknesses of the original 3.

A slidable or superimposable mask or template 10 may be provided between the light source 9 or 7 and the original 3 in order to display orientation symbols on the original 3. By way of example, FIG. 2 shows the mask 10 having a grid which is constituted by full lines and is in the form of a coordinate system. When an additional light source 9 is used, such a mask 10 may be located next to the light source 9 and, if necessary, may be provided with additional optical devices. In the event that the mask 10 is located next to the light source 9, it lies outside of the region which is exposed during the copying operation. When the source 7 of copying light is used for transillumination, the mask 10 may be in the form of a slide which is arranged parallel to the window 2. In this case, the mask 10 is located in the region of the window 2 during positioning of the original 3 and outside of this region during the copying operation. The mask 10 is here designed as a slidable plate which is capable of being transilluminated and is favorably interchangeable. As indicated previously, it may be advantageous to provide additional optical devices such as one or more lenses or the like when using the mask 10 to display orientation symbols.

Figure 3:
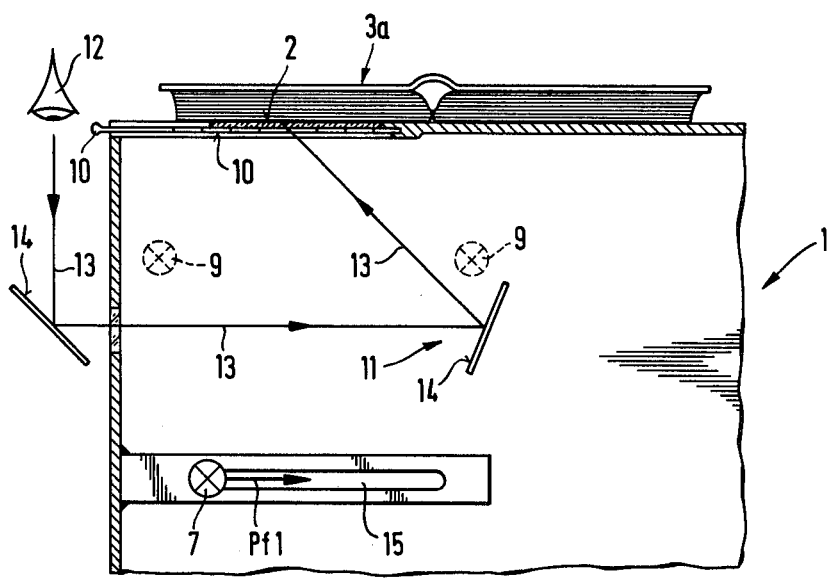
FIG. 3 is a cross-sectional view of another embodiment of a portion of a copier.

FIG. 3 shows another embodiment for originals 3a which are not capable of being transilluminated. In this case, a mirror or similar reflecting arrangement 11 is provided to permit external inspection of the original 3a which is supported in copying position. A light path is illustrated by rays 13 as extending from the eye 12 of an observer to the window 2 and the original 3a via mirrors 14. As a result, it is possible to properly position originals which are not capable of being transilluminated and, in particular, originals which are larger than the window 2 in contrast to the original 3a (book) illustrated in FIG. 3. The reference numeral 15 identifies a guide for the source 7 of copying light which travels away from the illustrated starting position in the direction of the arrow Pf 1 during the copying operation and subsequently returns to the starting position.

I claim:

1. A copier, particularly for copying documents, drawings and the like onto paper, said copier comprising:
    (a) a transparent support for supporting an original which is to be copied and is capable of being transilluminated;
    (b) illuminating means for illuminating the original prior to and during copying, said illuminating means including at least one illumination source capable of transilluminating the original while the latter is on said support so as to permit the original to be aligned prior to copying; and
    (c) activating means for said illuminating means designed to permit transillumination of the original on said support while copying of the original is inhibited.

2. A copier as defined in claim 1, wherein said illuminating means is located at one side of said support and the original is located at the opposite side of said support during transillumination and copying.

3. A copier as defined in claim 1, wherein said support is smaller than the original.

4. A copier as defined in claim 1, wherein said one illumination source is arranged to both transilluminate the original during alignment and illuminate the original during copying.

5. A copier as defined in claim 4, wherein said activating means comprises a switch for said one illumination source and said switch is provided with a stop for preventing copying of the original during transillumination.

6. A copier as defined in claim 1, wherein said illuminating means comprises an additional illumination source for illuminating the original during copying.

7. A copier as defined in claim 6, wherein said activating means comprises a switch for said additional illumination source and said switch is operative to deactivate said one illumination source upon activation of said additional illumination source.

8. A copier as defined in claim 1, comprising adjusting means for adjusting the intensity of said one illumination source.

9. A copier as defined in claim 8, wherein said adjusting means comprises a dimmer operable from externally of said copier.

10. A copier as defined in claim 1, comprising a template movable to and from a position between said one illumination source and said source, said template being designed such that at least one symbol for orienting the original is displayed on the latter when said template is in said position during transillumination of the original.

11. A copier as defined in claim 10, wherein said template is slidable to and from said position.

12. A copier as defined in claim 10, wherein said template is provided with a grid.

13. A copier as defined in claim 12, wherein said grid is constituted by broken lines.

14. A copier as defined in claim 12, wherein said grid is constituted by full lines.

15. A copier as defined in claim 10, wherein said template is provided with a pattern which forms a coordinate system.

16. A copier as defined in claim 10, wherein said template comprises a transparent plate.

17. A copier as defined in claim 10, wherein said template is interchangeable.

18. A copying method, particularly for copying documents, drawings and the like onto paper, said method comprising the steps of:
    (a) transilluminating an original to be copied by passing light from a first side to a second side thereof;
    (b) positioning said original during the transilluminating step on the basis of observations made from said second side; and
    (c) copying at least a portion of said original subsequent to the positioning step.

19. A method as defined in claim 18, said portion of said original constituting only part of said original; and wherein the positioning step comprises shifting said original so that substantially only said portion of said original is exposed during the copying step.

20. A method as defined in claim 18, further comprising the step of displaying at least one symbol on said original during the transilluminating step to assist in the positioning step.

* * * * *